United States Patent [19]

Alexander

[11] 4,285,703
[45] Aug. 25, 1981

[54] APPARATUS FOR CLEANING GAS

[75] Inventor: Robert O. Alexander, Mitcham, England

[73] Assignee: Cera International Limited, London, England

[21] Appl. No.: 137,498

[22] Filed: Apr. 4, 1980

Related U.S. Application Data

[63] Continuation of Ser. No. 5,552, Jan. 22, 1979, abandoned.

[30] Foreign Application Priority Data

Jan. 23, 1978 [GB] United Kingdom ............. 2703/78

[51] Int. Cl.³ ............................................. B01D 47/06
[52] U.S. Cl. ......................................... 55/228; 55/240;
55/260; 261/3; 261/23 R; 261/117; 261/DIG. 9
[58] Field of Search ............ 55/228, 240, 241, 257 PV,
55/258–260; 261/23 R, 115, 117, DIG. 9, DIG. 54, 79 A

[56] References Cited

U.S. PATENT DOCUMENTS

| | | | |
|---|---|---|---|
| 1,722,466 | 7/1929 | Hayes, Jr. .................... | 261/117 X |
| 2,795,288 | 6/1957 | Hirs .............................. | 55/240 X |
| 2,858,903 | 11/1958 | Goetz et al. ................ | 261/117 X |
| 3,092,677 | 6/1963 | Spence ........................ | 261/117 X |
| 3,119,675 | 1/1964 | Gallagher .................... | 55/240 X |
| 3,341,016 | 9/1967 | Paasche ....................... | 55/240 X |
| 3,784,017 | 1/1974 | Arnold et al. .............. | 55/228 X |
| 3,804,386 | 4/1974 | Arnold et al. .............. | 261/DIG. 54 |
| 4,067,707 | 1/1978 | Atsukawa et al. .......... | 261/117 X |
| 4,130,611 | 12/1978 | Brand ......................... | 261/115 X |

FOREIGN PATENT DOCUMENTS

| | | |
|---|---|---|
| 314906 | 7/1929 | United Kingdom . |
| 721812 | 1/1955 | United Kingdom . |
| 851555 | 10/1960 | United Kingdom . |
| 921387 | 3/1963 | United Kingdom . |
| 982525 | 2/1965 | United Kingdom . |
| 1501359 | 2/1978 | United Kingdom . |

Primary Examiner—Richard L. Chiesa
Attorney, Agent, or Firm—Larry S. Nixon

[57] ABSTRACT

An air washer comprises upper and lower plenum chambers which are separated by a panel which carries tubes. A spray nozzle above each tube is oriented to direct the conical spray it forms into the tube to wet the lower half of the bore of the tube. An inlet duct communicates with the lower plenum chamber. A tank is provided below the lower plenum chamber. Filter apparatus is provided in the tank. A fan communicates with the upper plenum chamber and draws air from the inlet duct via the plenum chambers and the parallel paths through the tubes. The air is washed by the spray formed by the nozzles which are fed with liquid drawn from the tank through the filter apparatus.

15 Claims, 3 Drawing Figures

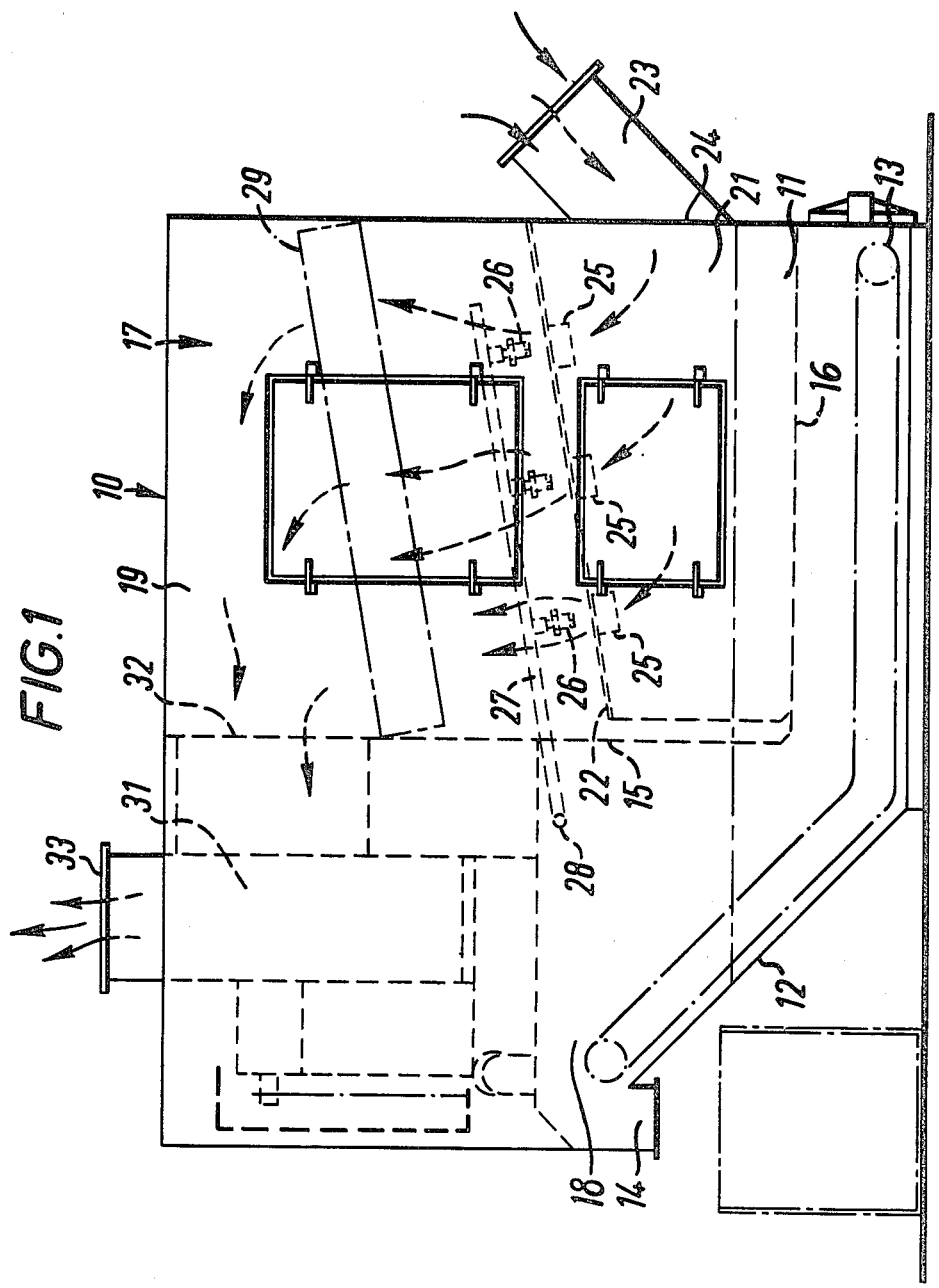

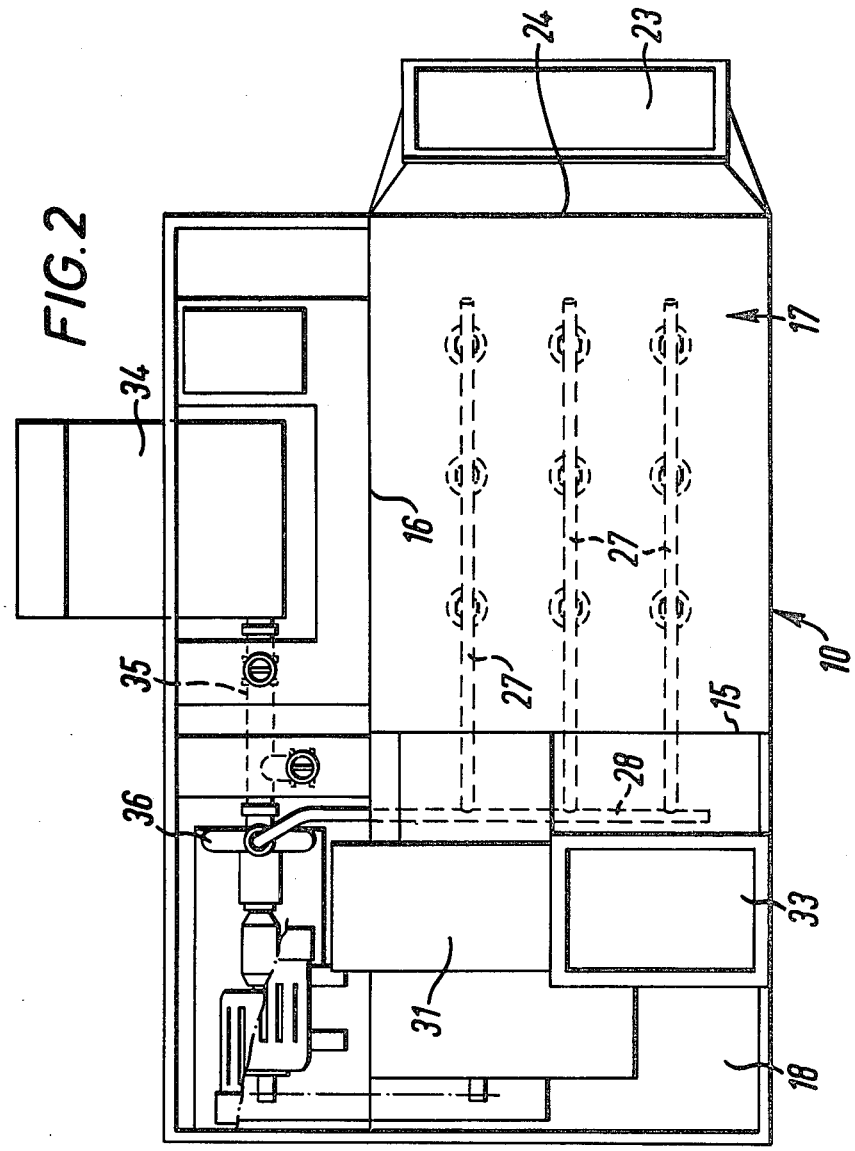

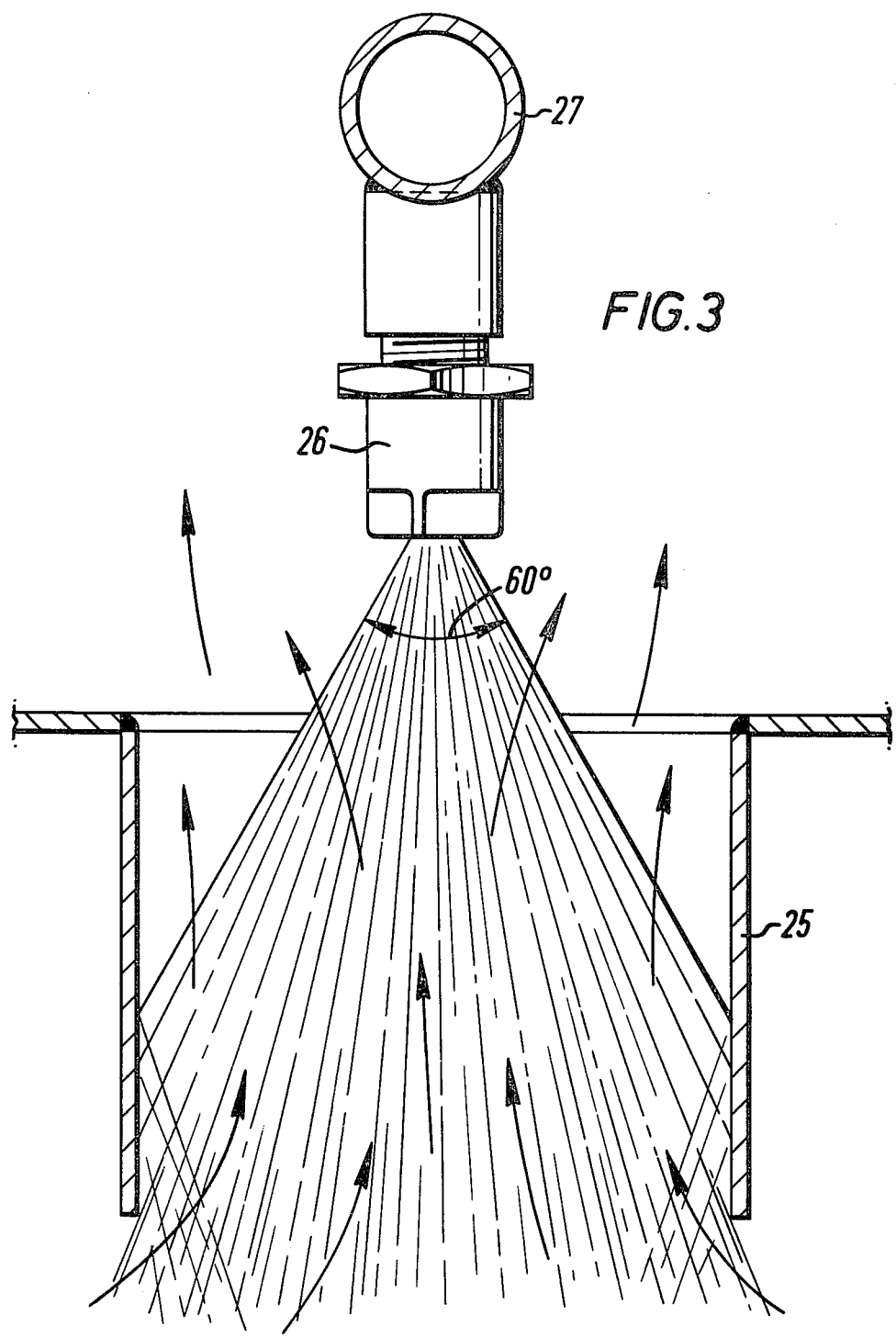

APPARATUS FOR CLEANING GAS

This is a continuation, of application Ser. No. 5,552 filed Jan. 22, 1979, now abandoned.

This invention relates to apparatus for cleaning gas, especially air such as the atmosphere in a workshop, in which gas to be cleaned is caused to flow through a spray of liquid so that contaminants carried by the gas are separated from the gas flow and collected with the liquid that falls from the spray.

One form of apparatus in which gas is washed by being passed through liquid spray is designed for cleaning gas exhausted via a chimney or flue and is adapted to be mounted on the top of such a chimney or flue.

It is common practice for the path through that form of apparatus for flow of gas which is exhausted from the chimney or flue to be formed by a single passage and for the spray of liquid to be formed as a substantially conical spray which extends to the walls of the passage. Such apparatus is unsuitable for cleaning the atmosphere in a workshop because both the efficiency of the apparatus and the throughput of gas through the apparatus are too low. I have realised that such apparatus is capable of cleaning only limited quantities of gas because the dimensions of the passage should not be so great that the density of the liquid spray and the kinetic energy of the liquid spray droplets fall below a minimum level for effective washing of gas flow through the passage at a given velocity. One object of this invention is to provide apparatus which is capable of cleaning large quantities of gas, especially air, to high orders of efficiency.

One well known form of gas cleaning apparatus includes rotary means for converting a stream of liquid into a high velocity spray which is directed radially outwardly from the rotary means. Another object of this invention is to provide apparatus for cleaning gas, especially air, which is less expensive, easier to manufacture and which requires less maintenance than that well known form of gas cleaning apparatus.

According to this invention there is provided apparatus for cleaning gas including means for directing gas to be cleaned along a path through the apparatus and open ended cylindrical passages forming part of said path and arranged in parallel with respect to the remainder of said path so that the total flow through the apparatus of gas to be cleaned is divided and shared between the cylindrical passages, each passage having respective liquid spray forming means associated with it, each liquid spray forming means being adapted to form a divergent stream of liquid spray and being orientated with respect to the passage with which it is associated such that the divergent stream of liquid spray that it forms is directed along the associated passage substantially coaxially towards one open end of the passage through which it passes out of the passage, the divergence of the stream of liquid spray and the radius of the associated cylindrical passage being such that the spray impinges the cylindrical wall of the associated passage and rebounds therefrom for a substantial axial distance extending to said one open end.

Preferably each liquid spray forming means are adapted to direct the divergent stream of liquid spray into the associated cylindrical passage such that it impinges only that part of the cylindrical wall that extends from partway along that cylindrical wall to said one open end, the remainder of that cylindrical wall that extends inwards from the other open end partway along the cylindrical wall not being impinged by the divergent stream.

Preferably said gas directing means comprise a fan which is adapted to draw gas to be cleaned, into the apparatus and through the cylindrical passages, and to discharge the cleaned gas from the apparatus. Conveniently, said gas directing means are adapted to direct gas to be cleaned upwards and the liquid spray forming means are adapted to direct the spray they form downwards so that liquid spray falls from the cylindrical passages to be collected below them. Preferably a plenum chamber is formed directly below the cylindrical passages so that liquid spray that falls from the cylindrical passages falls through it and so that it forms part of said path, the inlet by which gas flow is introduced into that plenum chamber being orientated with respect to the axis of each cylindrical passage so that the direction of the gas flow is deviated by a substantial amount within the plenum chamber before entering each cylindrical passage. Also the inlet is preferably arranged so that the velocity of gas flow directed through it into the plenum chamber falls significantly on entering the plenum chamber. Conveniently, there is another plenum chamber above the cylindrical passages so that the velocity of the gas flow drops as it passes from the cylindrical passages into the other plenum chamber.

Preferably the or each liquid spray forming means comprise a spray nozzle which is adapted to form a conical spray pattern. Conveniently the apparatus includes a storage tank which collects liquid droplets which fall from each cylindrical passage and which includes horizontal drum filter apparatus for filtering a stream of liquid that is drawn from the storage tank for feeding to each spray nozzle for formation into the conical spray pattern. The preferred form of spray nozzle comprises a tubular body which is tapered at the outlet end of the nozzle, the nozzle outlet comprising a helical slot formed through the wall of the tapered portion and the bore of the body being closed at the narrower end of the tapered body portion.

The features of the preferred form of apparatus in which this invention is embodied which comprise tubes that provide parallel paths for flow of gas to be cleaned between two plenum chambers, each tube having a nozzle which directs a substantially conical spray into it and against its wall, enables the capacity of the apparatus to be increased without risking undesirable reductions in the density of the spray pattern formed adjacent the passage wall and undesirable loss in kinetic energy of the spray droplets.

One form of air washer in which this invention is embodied will be described now by way of example with reference to the accompanying drawings, of which:

FIG. 1 is a side elevation of the air washer with diagrammatic indications of the air flow through the air washer when the washer is in operation;

FIG. 2 is a plan view of FIG. 1; and

FIG. 3 illustrates a typical liquid spray module of the air washer shown in FIGS. 1 and 2 and is drawn to a larger scale than are FIGS. 1 and 2.

The air washer comprises a generally rectangular fabricated metal casing 10. The lower part of the casing 10 forms a storage tank 11 for liquid. One end wall 12 of the storage tank 11 slopes upwardly and outwardly. A drag conveyor 13 extends along the flat bottom of the storage tank 11 and up the sloping end wall 12 to a discharge chute 14 which is located above the level of liquid in the storage tank 11.

Mutually perpendicular vertical separator panels 15 and 16 divide the interior of the casing 10 into two compartments 17 and 18. FIG. 2 shows that, in plan, the two compartments 17 and 18 comprise a rectangular compartment 17 which is located at one corner of the casing 10 and which is bounded by the two separator panels 15 and 16 and a major part of each of the two vertical side walls of the metal casing 10 that form that corner, and an L-shaped compartment 18 which is bounded by the remainder of the vertical side walls of the metal casing 10 and the separator panels 15 and 16. FIG. 2 also shows that the horizontal length of the separator panel 16, which is parallel to the longer vertical side wall of the casing 10, is greater than the horizontal length of the separator panel 15 and that the plan form area of the limb of the L-shaped compartment 18 that is bounded by the separator panel 16 is less than the plan form area of the limb of the L-shaped compartment 20 that is bounded by the other separator panel 15. FIG. 1 shows that the separator panels 15 and 16 extend below the level of the liquid within the storage tank 11 and that the rectangular compartment 17 has an open bottom.

The interior of the rectangular compartment 17 is divided into upper and lower plenum chambers 19 and 21 by a separator panel 22 which is angled to the horizontal, sloping downwards towards the separator panel 15 from the opposing side wall of the casing 10. The lower end of the sloping panel 22 is spaced from the separator panel 15. A panel which depends from the lower end of the sloping panel 22 co-operates with the panel 15 to form a vertical passage leading down to the tank 11. A tapered inlet duct 23 communicates at its larger area end with the lower plenum chamber 21 via an aperture 24 in the casing side wall that faces the separator wall 15 and is secured to the outer surface of that casing side wall, around the aperture 24, so that it slopes upwardly and outwardly from that location.

The sloping separator panel 22 carries tubes 25. Each tube 25 and a respective spray nozzle 26 form a liquid spray module. Each tube 25 is spigotted into a respective aperture in the sloping separator panel 22 so that it projects on either side of the panel 22 with its axis normal to the plane of the panel 22. The number of liquid spray modules provided is selected in accordance with the required flow rate at which air to be washed is passed through the washer. It is thought that at last five liquid spray modules are required for a practical air washer that can wash the atmosphere of a workshop efficiently. The factors that determine the optimum dimensions of each tube 25 are discussed below. The modules may be arranged in any convenient pattern, dependent upon the number required. Where there are nine modules, as in the arrangement shown in FIG. 2, they are conveniently arranged in three rows, three abreast and one behind another.

FIG. 3 illustrates a typical liquid spray module. The spray nozzle 26 is supported above the respective tube 25 by a liquid header pipe 27 to which it is welded, the spray nozzle 26 having been located with precision in alignment with a respective port in the header pipe 27 and in coaxial alignment with the respective tube 25 when being welded. The spray nozzle 26 functions to atomise a stream of liquid fed to it under pressure from the header pipe 27 through the respective port and convert it into a conical spray pattern which comprises a substantially uniformly distributed conglomerate of moving liquid droplets which is contained within a notional conical envelope. The relative location of the spray nozzle 26 and the respective tube 25, and the cone angle of the notional conical envelope within which the conical spray pattern is contained are such that the conical spray pattern is directed into the respective tube so that part of the cylindrical inner surface of the tube 25 is wetted by the spray pattern, the wetted surface part being cylindrical and extending from about the middle of the tube 25 to the lower end of that tube 25. The cone angle of the preferred conical spray pattern is 60°.

The configuration of the header pipes 27 depends upon the number of liquid spray modules and the pattern in which they are arranged. In the arrangement shown in FIG. 2 there are three such header pipes 27, each carrying three spray nozzles 26 and each comprising a branch from a master header pipe 28.

A bank 29 of moisture eliminators is housed in the upper plenum chamber 19 above the header pipes 27. The bank 29 of moisture eliminators is conveniently parallel to the sloping separator panel 22 and is approximately midway between the sloping separator panel 22 and the top of the upper plenum chamber 21.

A motor driven fan 31 has an air inlet which communicates with the upper plenum chamber 19 above the bank 29 of moisture eliminators through an aperture 32 in the shorter separator panel. The fan 31 also has an upwardly opening air outlet 33 from which clean air is discharged.

Horizontal drum filter apparatus 34, provided in the storage tank 11. Preferably the filter media belt of the drum filter apparatus 34 is coated with a hard wearing low friction plastics material, such as Teflon. A pipe 35 connects the interior of the drum of the drum filter apparatus 34 to the input of a motor driven pump 36. The output of the pump 36 is connected to the master header pipe 28 and then in parallel to each of the spray nozzles 26.

In operation of the apparatus, the pump 36 draws filtered liquid from the interior of the drum and feeds it under pressure through the master header pipe 28 and the header pipes 27 to the spray nozzles 26. The liquid is atomised and formed into a conical spray pattern by each spray nozzle 26. The conical spray emitted by each spray nozzle 26 is directed coaxially into the respective tube 25 so that the cylindrical space bounded by the part of the inner surface of each tube 25 that is wetted by the spray is filled with moving liquid droplets which comprise a dense turbulent mass of high energy droplets. The axial extent of the part of the inner surface of each tube 25 upon which the spray impinges causes a build up of liquid adjacent the end of the inner surface further from the respective nozzle 26 so that there is substantially no pressure variation across the cylindrical space that is filled with liquid droplets or, if there should be a low pressure region, it is spaced inwardly from the wall of the tube 25. The liquid droplets that make up the spray directed into each tube 25 pass through the lower end of that tube 25 and fall through the lower plenum chamber 21 into the storage tank 11. Hence the lower plenum chamber 21 is substantially filled with falling droplets of liquid.

The fan 31 is driven so that air to be cleaned is drawn into the lower plenum chamber 21 through the inlet duct 23, up through the tubes 25 into the upper plenum chamber 19, through the bank 29 of moisture eliminators and through the aperture 32 into the fan 31 from which it is discharged through the air outlet 33.

The velocity of the air flow is reduced substantially as it enters the lower plenum chamber 21 from the inlet duct 23 and that velocity reduction, together with the change in the direction of that air flow through the lower plenum chamber 21 results in the larger contaminants that are carried into the lower plenum chamber 21 by the air flow being separated from that air flow and dropped into the liquid storage tank 11. Also the falling liquid droplets in the lower plenum chamber 21 interact with the air flow through that plenum chamber 21 to effect a preliminary washing of that air. The velocity of the air flow increases as it flows through the tubes 25. Contaminants carried into each tube 25 by the air flow through that tube 25 are separated from that air flow in the known manner by the interaction of that contaminated air flow with the dense turbulent mass of high energy liquid droplets in that tube 25 so that these contaminants fall to the liquid storage tank 11 with the droplets of liquid that fall from that tube 25.

Moisture is removed from the air that emerges from the tubes 25 into the upper plenum chamber 19 firstly by the reduction in velocity of that air flow as it enters the upper plenum chamber 19 and then by the bank 29 of moisture eliminators. Hence the air discharged by the fan 31 is both clean and dry. Moisture removed from the air as that air enters the upper plenum chamber is deposited on the separator panel 22. Moisture deposited on the separator panel 22 flows down that panel 22 and falls from the lower edge of that panel 22 to the tank 11 via the vertical passage.

The larger contaminants are carried out of the storage tank 11 by the drag conveyor 13 and are discharged from the casing 10 through the discharge chute 14. The remaining contaminants are separated from the liquid in the storage tank 11 by the drum filter apparatus 31 and are discharged by the filter media belt.

The optimum axial length and diameter of each of the cylindrical passages formed by the tubes 25 are dependent upon a number of factors. On the one hand the volume of the space within each tube 25 that is filled with moving droplets should be as large as is practicable to maximise the effectiveness of the washing action caused by the interaction of the air flow and the moving liquid droplets. On the other hand the distance between each spray nozzle 26 and the further end of the cylindrical surface of the respective tube 25, and hence both the length and the diameter of the bore of that tube 25, should not be so great that the density of the liquid spray and the kinetic energy of the moving liquid droplets fall below a minimum level for effective washing of air flow through that tube at a given velocity before those droplets reach the further end of that tube 25. Also there is a certain minimum axial length of the cylindrical surface of each tube 25 that is not impinged directly by liquid droplets of the conical spray pattern emitted by the respective spray nozzle 26 because there is a tendency for those liquid particles to be borne upwards out of the tubes 26 into the upper plenum chamber 19 with the air flow through those tubes 25 if that axial dimension should be reduced beyond that minimum.

It should be noted that the length of the tube 25 of the exemplary liquid spray module shown in FIG. 3 is clearly less than the diameter of that tube and in fact is approximately three-quarters of that diameter.

Tests conducted on an air washer constructed as described above with reference to the accompanying drawings resulted an efficiency of 99.935% being measured when the air washer was operated to wash workshop atmosphere contaminated with dust.

Various modifications may be made to the air washer described above with reference to the drawings. The preferred form of spray nozzle comprises a tubular body which is tapered at the outlet end, there being a helical slot formed through the wall of the tapered portion and the bore of the body being closed at the narrower end of the tapered body portion. The angle of the cone is determined by the angle of the helical slot relative to the axis of the bore.

The orientation of the fan and the inlet duct relative to the sloping panel 22 may be changed with advantage. The moisture content of air discharged by the fan is even lower if the fan is mounted centrally at the top of the upper plenum chamber 19, rather than to one side as shown in FIG. 2. The directional change of air flow through the lower plenum chamber can be increased by extending the lower plenum chamber from immediately below the upper end of the sloping panel 22 and away from the separator panel 15 and by forming the inlet duct in the top of that lower plenum chamber extension so that the inlet duct extends upwards vertically.

I claim:

1. Apparatus for cleaning gas, comprising:
   means for directing gas to be cleaned along a path through the apparatus;
   a plurality of spaced cylindrical passages positioned in said path and substantially spaced apart from one another thereby substantially reducing the cross-sectional area thereof and correspondingly significantly increasing the velocity of gas flow therethrough, said passages being arranged such that the total flow of gas through the apparatus is divided among the cylindrical passages;
   a plurality of spray nozzles positioned in said path and arranged in coaxial and longitudinally spaced relationship with respective ones of said passages, each nozzle being adapted to form a conical pattern of liquid spray which is directed within its respective passage, the divergence of each conical spray pattern and the radius of the associated cylindrical passage being such that the spray impinges on the cylindrical wall of the passage at a location axially spaced a substantial distance from an end of the passage adjacent the nozzle and rebounds therefrom to exit from the opposite end of said passage, with substantially no liquid flow through the passages in the direction of gas flow; and
   means for supplying liquid to said nozzles.

2. Apparatus according to claim 1, wherein said gas directing means comprise a fan which is adapted to draw gas to be cleaned into the apparatus and through the cylindrical passages and to discharge the cleaned gas from the apparatus.

3. Apparatus according to claim 1, wherein said gas directing means are adapted to direct gas to be cleaned upwards and the liquid spray forming nozzles are adapted to direct the spray they form downwards so that liquid spray falls from the cylindrical passages to be collected below them.

4. Apparatus according to claim 3, including a storage tank which collects liquid droplets which fall from each cylindrical passage and which includes horizontal drum filter apparatus for filtering a stream of liquid that is drawn from the storage tank by said liquid supplying means for feeding to each spray nozzle for formation into the conical spray pattern.

5. Apparatus according to claim 3, wherein a plenum chamber is formed directly below the cylindrical passages so that liquid spray that falls from the cylindrical passages falls through it, and so that it forms part of said path, the inlet by which gas flow is introduced into the plenum chamber being orientated with respect to the axis of each cylindrical passage so that the direction of the gas flow is deviated by a substantial amount within the plenum chamber before entering each cylindrical passage.

6. Apparatus according to claim 5, wherein the inlet is arranged so that the velocity of gas flow directed through it into the plenum chamber falls significantly on entering the plenum chamber.

7. Apparatus according to claim 5, wherein there is another plenum chamber above the cylindrical passages so that the velocity of the gas flow drops as it passes from the cylindrical passages into the other plenum chamber.

8. Apparatus according to claim 1, wherein each spray nozzle is adapted to form a full conical spray pattern which comprises a substantially uniformly distributed configuration of moving liquid droplets which is contained within a notional conical envelope.

9. Apparatus according to claim 1, wherein the axial length of each of the spaced cylindrical passages is less than its diameter.

10. Apparatus for cleaning gas, comprising:
means for directing gas to be cleaned along a path through the apparatus;
a plurality of spaced cylindrical passages positioned in said path and reducing the cross-sectional area thereof, said passages being arranged such that the total flow of gas through the apparatus is divided among the cylindrical passages;
a plurality of spray nozzles positioned in said path and arranged in coaxial and longitudinally spaced relationship with respective ones of said passages, each nozzle being adapted to form a conical pattern of liquid spray which is directed within its respective passage, the divergence of each conical spray pattern and the radius of the associated cylindrical passage being such that the spray impinges on the cylindrical wall of the passage only between a location axially spaced from an end of the passage adjacent the nozzle and the opposite end of said passage and rebounds therefrom to exit from said opposite end of said passage, the remainder of that cylindrical wall that extends inwards from said end of the passage adjacent the nozzle to said location not being impinged by the spray and having sufficient axial length for liquid spray droplets not to be borne out of said end of the passage adjacent the nozzle by gas flow through the passage; and
means for supplying liquid to said nozzles.

11. Apparatus according to claim 10 wherein said plurality of spaced cylindrical passages are each formed by a respective tube, and a sloping panel is provided and has apertures formed in it, each tube being spigotted into a respective one of the apertures so that the panel is oblique to the axes of the tubes.

12. Apparatus for cleaning gas, comprising:
means for directing gas to be cleaned along a path through the apparatus;
a plurality of spaced cylindrical passages positioned in said path and reducing the cross-sectional area thereof, said passages being arranged such that the total flow of gas through the apparatus is divided among the cylindrical passages;
a plurality of spray nozzles positioned in said path and arranged in coaxial and longitudinally spaced relationship with respective ones of said passages, each nozzle being adapted to form a full conical pattern of liquid spray which is directed within its respective passage and which comprises a substantially uniformly distributed configuration of moving liquid droplets which is contained within a notional conical envelope, the divergence of each conical spray pattern and the radius of the associated cylindrical passage being such that the spray impinges on the cylindrical wall of the passage only between a location axially spaced from an end of the passage adjacent the nozzle and the opposite end of said passages and rebounds therefrom to exit from said opposite end of said passage, the remainder of that cylindrical wall that extends inwards from said end of the passage adjacent the nozzle to said location not being impinged by the spray and having sufficient axial length for liquid spray droplets not to be borne out of said end of the passage adjacent the nozzle by gas flow through the passage; and
means for supplying liquid to said nozzles.

13. Apparatus for cleaning gas, comprising:
means for directing gas to be cleaned upwards along a path through the apparatus;
a plurality of horizontally-spaced vertically-oriented cylindrical passages positioned in said path and reducing the cross-sectional area thereof, said passages being arranged such that the total flow of gas through the apparatus is divided among the cylindrical passages;
a plurality of spray nozzles positioned in said path above said passages and arranged in coaxial and longitudinally spaced relationship with respective ones of said passages, each nozzle being adapted to form a full conical pattern of liquid spray which is directed downwards within its respective passage and which comprises a substantially uniformly distributed configuration of moving liquid droplets which is contained within a notional conical envelope, the divergence of each conical spray pattern and the radius of the associated cylindrical passage being such that the spray impinges only on a lower part of the cylindrical wall of the passage that extends between a location axially spaced from the upper end of the passage and the lower end of said passage and rebounds therefrom to exit from said lower end of said passage, the remainder of that cylindrical wall that extends downwards from said upper end of the passage to said location not being impinged by the spray and having sufficient axial length for liquid spray particles not to be borne out of said upper end of the passage adjacent the nozzle by gas flow through the passage;
means for supplying liquid to said nozzles; and
a storage tank which collects liquid droplets which fall from each cylindrical passage and which includes a horizontal drum filter apparatus for filtering a stream of liquid that is drawn from the storage tank by said liquid supplying means for feeding to each spray nozzle for formation into the full conical spray pattern.

14. Apparatus for cleaning gas, comprising:
means for directing gas to be cleaned upwards along a path through the aparatus;
a plurality of horizontally-spaced vertically-oriented cylindrical passages positioned in said path and reducing the cross-sectional area thereof, said passages being arranged such that the total flow of gas through the apparatus is divided among the cylindrical passages;
a plurality of spray nozzles positioned in said path above said passages and arranged in coaxial and longitudinally spaced relationship with respective ones of said passages, each nozzle being adapted to form a full conical pattern of liquid spray which is directed downwards within its respective passage and which comprises a substantially uniformly distributed configuration of moving liquid droplets which is contained within a notional conical envelope, the divergence of each conical spray pattern and the radius of the associated cylindrical passage being such that the spray impinges only on a lower part of the cylindrical wall of the passage that extends between a location axially spaced from the upper end of the passage and the lower end of said passage and rebounds therefrom to exit from said lower end of said passage, the remainder of that cylindrical wall that extends downwards from said upper end of the passage to said location not being impinged by the spray and having sufficient axial length for liquid spray particles not to be borne out of said upper end of the passage adjacent the nozzle by gas flow through the passage;
means for supplying liquid to said nozzles;
a plenum chamber which is formed directly below the cylindrical passages so that liquid spray that falls from the cylindrical passages falls through it and so that is forms part of said path;
an inlet by which gas flow is introduced into the plenum chamber, said inlet being arranged so that the velocity of gas flow directed through it into the plenum chamber falls significantly on entering the plenum chamber and being orientated with reference to the axis of each cylindrical passage so that the direction of gas flow is deviated by a substantial amount before entering each cylindrical passage; and
a storage tank below said plenum chamber which collects liquid droplets which fall from each cylindrical passage through said plenum chamber and which includes a horizontal drum filter apparatus for filtering a stream of liquid that is drawn from the storage tank by said liquid supplying means for feeding to each spray nozzle for formation into the full conical spray pattern.

15. Apparatus for cleaning gas, comprising:
means for directing gas to be cleaned upwards along a path through the apparatus;
a plurality of horizontally-spaced vertically-oriented cylindrical passages positioned in said path and reducing the cross-sectional area thereof, said passages being arranged such that the total flow of gas through the apparatus is divided among the cylindrical passages; each said cylindrical passage being formed by a respective tube;
a plurality of spray nozzles positioned in said path above said passages and arranged in coaxial and longitudinally spaced relationship with respective ones of said passages, each nozzle being adapted to form a full conical pattern of liquid spray which is directed downwards within its respective passage and which comprises a substantially uniformly distributed configuration of moving liquid droplets which is contained within a notional conical envelope, the divergence of each conical spray pattern and the radius of the associated cylindrical passage being such that the spray impinges only on a lower part of the cylindrical wall of the passage that extends between a location axially spaced from the upper end of the passage and the lower end of said passage and rebounds therefrom to exit from said lower end of said passage, the remainder of that cylindrical wall that extends downwards from said upper end of the passage to said location not being impinged by the spray and having sufficient axial length for liquid spray particles not to be borne out of said upper end of the passage adjacent the nozzle by gas flow through the passage;
means for supplying liquid to said nozzles;
a plenum chamber which is formed directly below the cylindrical passages so that liquid spray that falls from the cylindrical passages falls through it and so that it forms part of said path;
an inlet by which gas flow is introduced into the plenum chamber, said inlet being arranged so that the velocity of gas flow directed through it into the plenum chamber falls significantly on entering the plenum chamber and being orientated with reference to the axis of each cylindrical passage so that the direction of gas flow is deviated by a substantial amount before entering each cylindrical passage;
a storage tank which collects liquid droplets which fall from each cylindrical passage and which includes a horizontal drum filter apparatus for filtering a stream of liquid that is drawn from the storage tank by said liquid supplying means for feeding to each spray nozzle for formation into the full conical spray pattern; and
another plenum chamber above said cylindrical passages so that the velocity of the gas flow drops as it passes from the cylindrical passages into the other plenum chamber, there being a sloping panel by which the two plenum chambers are separated and which has apertures formed in it, each tube being spigotted into a respective one of the apertures so that the panel is oblique to the axes of the tubes, the higher edge of the sloping panel being above said inlet and there being a drain passage by which the lower edge of the sloping panel is in communication with said storage tank.

* * * * *